United States Patent [19]

Sato

[11] Patent Number: 4,567,791

[45] Date of Patent: Feb. 4, 1986

[54] MANUAL DEVICE FOR DETECTING MALFUNCTION OF A SOLENOID VALVE

[75] Inventor: Masayuki Sato, Komatsu, Japan

[73] Assignee: Kabushiki Kaisha Komatsu Seisakusho, Tokyo, Japan

[21] Appl. No.: 465,320

[22] Filed: Feb. 9, 1983

[30] Foreign Application Priority Data

Feb. 9, 1982 [JP] Japan ............................. 57-15897[U]

[51] Int. Cl.⁴ ............................................. B60K 41/06
[52] U.S. Cl. ....................................... 74/869; 74/867; 116/272
[58] Field of Search ................... 251/30; 116/266, 272; 74/867, 868, 869; 73/168

[56] References Cited

U.S. PATENT DOCUMENTS

| | | | |
|---|---|---|---|
| 3,411,475 | 11/1968 | Sheff | 116/272 |
| 3,691,981 | 9/1972 | Rao | 116/272 |
| 3,698,682 | 10/1972 | Berning et al. | 251/30 |
| 3,709,064 | 1/1973 | Schafer et al. | 74/869 X |
| 3,738,311 | 6/1973 | Appleton | 116/272 |
| 3,823,621 | 7/1974 | Kubo et al. | 74/869 X |
| 3,967,495 | 7/1976 | Wesner et al. | 73/118 |
| 4,029,042 | 6/1977 | Juhasz | 116/272 X |
| 4,155,277 | 5/1979 | Minami et al. | 74/867 X |
| 4,298,181 | 11/1981 | Corrado et al. | 251/30 X |
| 4,308,764 | 1/1982 | Kawamoto et al. | 74/869 X |
| 4,445,528 | 5/1984 | Miki et al. | 251/30 X |

Primary Examiner—Leslie A. Braun
Assistant Examiner—Dwight G. Diehl
Attorney, Agent, or Firm—Armstrong, Nikaido, Marmelstein & Kubovcik

[57] ABSTRACT

A detecting device for solenoid operated valve, the valve being located between a pilot fluid pressure supply source via a pilot operated directional control valve associated with the solenoid operated valve and a drain tank and adapted to be switched over to either a connecting position where an inlet port thereof for pressurized pilot fluid is allowed to communicate with a drain port thereof connected to the drain tank or a disconnecting position where the inlet port is disconnected from the drain port. The detecting device has a cylinder chamber connected to the inlet port of the solenoid operated valve and a plunger inserted partially into the cylinder chamber so as to form a pressure chamber therebetween, wherein the plunger is able to be pushed manually into the pressure chamber only when the solenoid operated valve is kept at the connecting position.

1 Claim, 6 Drawing Figures

FIG. 2

| | CLUTCHES | | | | | | | SOLENOID OPERATED VALVES | | | | | |
|---|---|---|---|---|---|---|---|---|---|---|---|---|---|
| | R | I | II | III | L | M | H | 6a | 3a | 4a | 5a | 2a | 1a |
| R | O | | | | O | | | O | | | | O | |
| N | | | | | | O | | | | | | | |
| F1 | | O | | | O | | | | O | | | O | |
| F2 | | | | | O | | | | | O | | O | |
| F3 | | O | | | | O | | | O | | | | |
| F4 | | | O | | | | O | | | O | | | O |
| F5 | | | | | | O | | | | | | | O |
| F6 | | | O | | | O | O | | | O | | | |
| F7 | | | | O | | O | | | | | O | | |
| F8 | | | | O | | | O | | | | O | | O |

MANUAL DEVICE FOR DETECTING MALFUNCTION OF A SOLENOID VALVE

BACKGROUND OF THE INVENTION

1. Field of The Invention

This invention relates to a pilot operated directional control valve system for use in an automatic transmission mounted in a construction vehicle or the like such as, for example, a dump truck, a motor scraper, etc., and more particularly to a device for detecting a malfunction or wrong operation of a solenoid operated valve operatively associated with the pilot operated directional control valve.

2. Description of The Prior Art

The pilot operated directional control valves have so far been employed in speed change controls of automatic transmissions of construction vehicles or the like. Each of the control valves of the kind specified is adapted to control the pilot pressurized fluid flow pass through in a valve spool thereof by means of a solenoid operated valve operatively associated with the control valve to allow the valve spool to slide in the control valve, so that a flow direction of pressurized fluid for engaging or disengaging a clutch mounted in the transmission is controlled. Accordingly, if a malfunction or wrong operation of the solenoid operated valve occurs, it becomes impossible to slide the valve spool of the control valve. Consequently, correct change-over operation of pilot operated directional control valves becomes unable to be obtained.

It is difficult, however, to check if the solenoid operated valve functions correctly in the valve control system so far employed. Particularly, in a multi-speed-stage automatic transmission provided with a multiplicity of solenoid operated valves, it is extremely difficult to detect which of the solenoid operated valves is malfunctioning. Moreover, in the multi-speed-stage automatic transmission, one or two solenoid operated valves are employed for each speed-stage, and some of the solenoid operated valves are commonly used for two or more speed-stages. Therefore, it is difficult to find out which of the solenoid valves is malfunctioning when a correct speed change operation cannot be made, and eventually all the solenoid valves must be disassembled, in turn, for checking.

Furthermore, it has been known in the art that 95% or more of the malfunctions of solenoid valves are due to the intrusion of foreign matters contained in the pilot fluid between the valve body and the seat thus making it impossible to achieve sealing or cut off function of the pilot fluid flow therethrough.

SUMMARY OF THE INVENTION

The present invention has been contemplated in view of the above-mentioned circumstances, and has for its object to provide a device for detecting easily a malfunction or wrong operation of the solenoid valves associated with pilot operated directional control valves for use in automatic transmissions of construction vehicles, etc. .

To achieve the above-mentioned object, in accordance with the present invention, there is provided a device for detecting a malfunction or wrong operation of a plurality of solenoid operated valves operatively associated with a plurality of pilot operated directional control valves adapted to control the fluid pressure to be supplied into piston-cylinder assemblies for actuating a plurality of clutches mounted in a multi-speed-stage automatic transmission for variable speed change of a vehicle, said solenoid operated valves each being located between a pilot fluid pressure supply source via the pilot operated directional control valve having a restrictor and a drain tank to enable respective pilot operated directional control valves to be switched over properly and selectively to obtain a desired speed-stage, and said solenoid operated valves each being adapted to be switched over to either a connecting position where an inlet port thereof for the pilot pressurized fluid is allowed to communicate with a drain port connected to the drain tank or a disconnecting position where the inlet port is disconnected from the drain port, characterized in that the detecting device comprises a cylinder chamber connected to the inlet port of the solenoid operated valve and a plunger inserted partially into the cylinder chamber so as to form a pressure chamber therebetween, wherein said plunger is able to be pushed manually into the pressure chamber only when the solenoid valve is kept at the connecting position thereof.

The above and many other advantages, features and additional objects of the present invention will become apparent to those versed in the art upon making reference to the following detailed description and accompanying drawings in which preferred structural embodiments incorporating the principles of the present invention are shown by way of illustrative example.

BRIEF DESCRIPTION OF THE DRAWINGS

In accompanying drawings:

FIG. 2 is a table showing combinations of clutches and solenoid operated valves in each speed-stage of the multi-speed-stage automatic transmission;

DETAILED DESCRIPTION OF A PREFERRED EMBODIMENT

Figure 1:
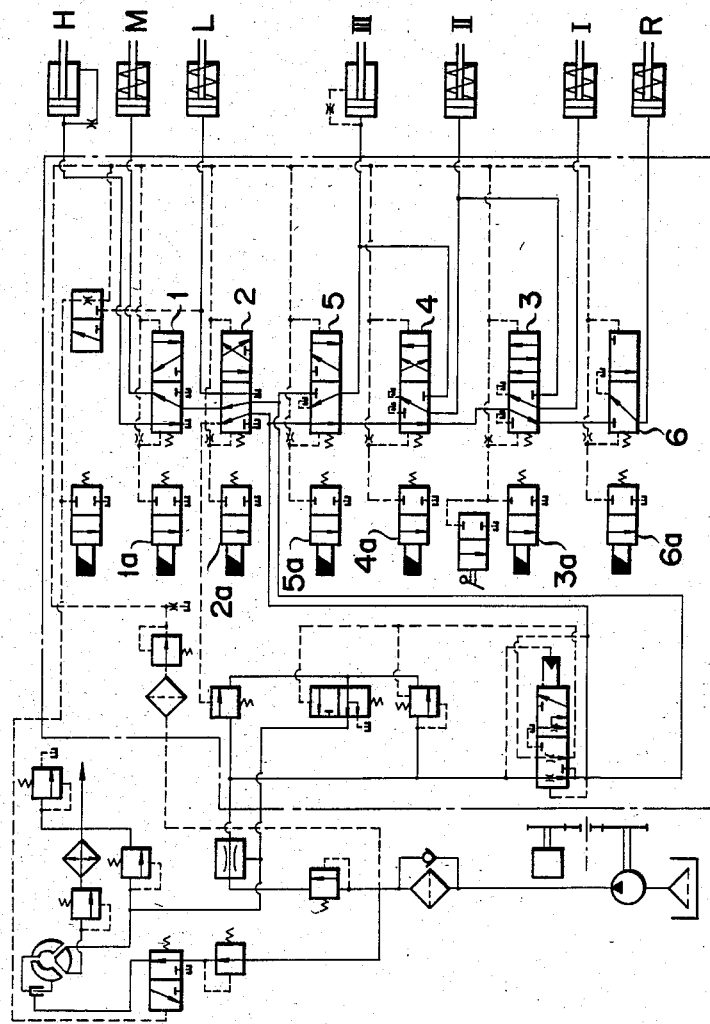
FIG. 1 is a schematic diagram of a hydraulic circuit for controlling a multi-speed-stage automatic transmission.

FIG. 1 is a schematic diagram of a hydraulic circuit for controlling a multi-speed-stage automatic transmission. The hydraulic circuit comprises high, medium and low speed piston-cylinder assemblies H, M and L; first, second and third speed piston-cylinder assemblies I, II and III; and a reversing piston-cylinder assembly R. The arrangement is made such that speed change controls to each speed-stage can be achieved by selectively controlling the supply of pressurized fluid into each piston-cylinder assembly by means of high and low speed pilot operated directional control valves 1 and 2; first, second and third speed pilot operated directional control valves 3, 4 and 5; and a reversing pilot operated directional control valve 6.

The above-mentioned pilot operated directional control valves are arranged to be changed over in speed change to each speed-stage of forward eight speed-stages and backward one speed-stage by energizing at least one or at most two corresponding solenoid operated valves 1a, 2a, 3a, 4a, 5a and 6a, respectively, as shown in the table in FIG. 2.

The above-mentioned directional control valves are individually somewhat different in detail, but they are constructed generally such that a valve spool 14 adapted to connect or disconnect an inlet port 11 and an outlet port 12 or the outlet port 12 and a drain port 13 is slidably inserted within a bore 10a formed in a valve body 10; the valve spool 14 being maintained by the force of a spring 15 in such a position as to allow the outlet port 12 to communicate with the drain port 13; a longitudinally extending bore 18 being formed in the valve spool 14 along the axis thereof to allow communication between a pilot fluid pressure chamber 16 and a drain chamber 17; the pilot fluid pressure chamber 16 being connected through a pilot fluid passage 7 to a pilot fluid pressure supply source; the drain chamber 17 being connected through a solenoid operated valve 19 to a drain tank 20. The above-mentioned bore 18 is provided with a restrictor 21. The solenoid operated valve 19 is arranged to be kept normally in a disconnecting position A by a resilient force of the spring 15 and, on the other hand, changed over to a connecting position B connecting the drain chamber 17 to the drain tank when its solenoid 19a is energized.

Figure 3:
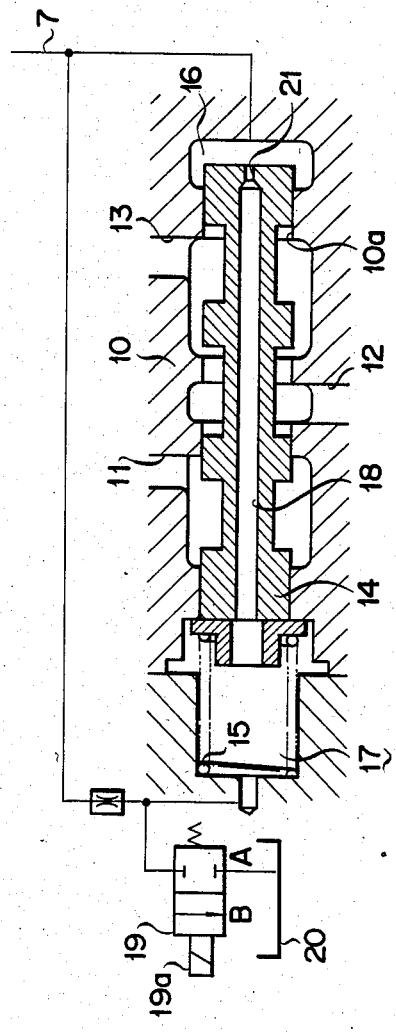
FIG. 3 is a schematic fragmentary sectional view of a pilot operated directional control valve associated with a solenoid operated valve.
Figure 4:
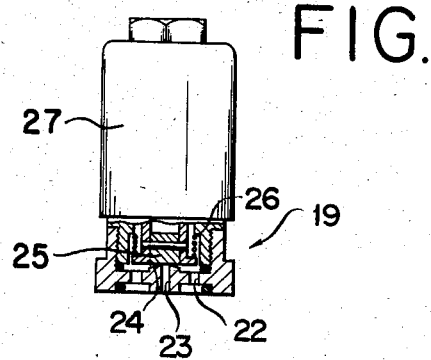
FIG. 4 is a sectional view of one embodiment of the solenoid operated valve.

When the solenoid operated valve 19 is kept in its disconnecting position A, pilot pressurized fluid is not allowed to pass through in the bore 18 with the result that the spool 14 may be kept in the position shown in FIG. 3. When the solenoid operated valve 19 is switched over to its connecting position B, the pilot pressurized fluid is allowed to pass through in the bore 18 so as to cause a pressure difference between the front and the rear of the restrictor 21 so that the spool 14 may move to the left thus allowing fluid communication between the inlet port 11 and the outlet port 12.

The above-mentioned solenoid operated valve 19 is constructed such that connection or disconnection between an inlet port 22 and a drain port 23 thereof can be effected by pressing a valve body 25 against a valve seat 24 or moving the valve body 25 away from the valve seat 24, respectively, the valve body 25 being arranged to be pressed against the valve seat 24 by a resilient force of a spring 26 and, when its solenoid 27 is energized, to be moved away from the valve seat 24.

Therefore, when dust or fine chips, etc. mixed within the fluid are deposited on the valve seat 24, the valve body 25 cannot oil-tightly contact the valve seat 24 and will always be kept open thus causing a malfunction thereof.

Figure 5:
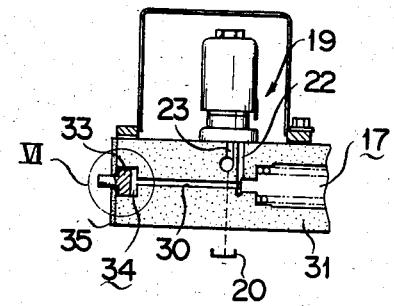
FIG. 5 is a fragmentary sectional view showing one embodiment of a device for detecting malfunction of the solenoid operated valve according to the present invention.
Figure 6:
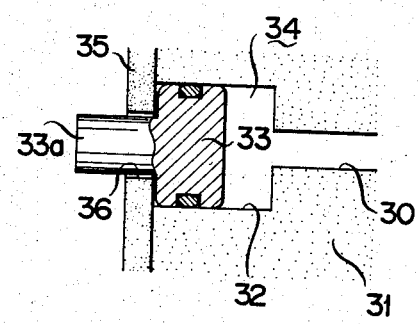
FIG. 6 is an enlarged view of a circle VI shown in FIG. 5.

According to the present invention, as shown in FIGS. 5 and 6, a solenoid valve body 31 is formed with a communicating hole 30 connected to the drain chamber 17 of the valve 10 and the hole 30 is formed with a cylinder chamber 32 in which a plunger 33 is inserted so as to form a pressure chamber 34 therebetween, said plunger 33 having a reduced diameter portion 33a projecting outwardly through a hole 36 formed in a stopper plate 35.

Thus, when the solenoid operated valve 19 is kept in its connecting position B, pilot fluid under pressure within the drain chamber 17 will flow through the inlet port 22 and the drain port 23 into the drain tank 20, because the valve body 25 is kept away from the valve seat 24.

As a result, the pressure within the pressure chamber 34 will drop so that the plunger 33 can be easily pushed in by the operator's hand.

Further, when the solenoid operated valve 19 is kept in its disconnecting position A, the pressurized fluid within the drain chamber 34 is not allowed to flow into the drain tank 20 so as to cause a pressure rise within the pressure chamber 34, so that the plunger 33 cannot be pushed inwards.

Therefore, when the solenoid operated valves of the pilot operated directional control valves are kept in their disconnecting positions and the transmission is located in its neutral position and if each of the solenoid operated valves 19 functions correctly, the pressure within each of the drain chambers 17 will increase and hence the pressure within the pressure chamber 34 will rise so that the plungers 33 cannot be pushed inwards. In the case where dust or chips, etc. intruded in between the valve body 25 and the valve seat 24 thus making it impossible to disconnect the inlet port 22 from the outlet port 23 (i.e, in the case the valve is malfunctioning), the pressure within the drain chamber 17 will drop and therefore the pressure within the pressure chamber 34 will decrease, so that the plunger 33 can be easily pushed in manually.

Therefore, it becomes possible for the operator to detect easily which of the solenoid operated valves is malfunctioning.

Further, in the case where the solenoid operated valve cannot be changed over to its connecting position B because of breaking of the wire of the solenoid coil 27, the plunger 33 which can otherwise be pushed in becomes unable to be pushed in so that malfunctioning of the solenoid operated valve 19 can be detected.

It is to be understood that the foregoing description is merely illustrative of a preferred embodiment of the invention, and that the scope of the invention is not to be limited thereto, but is to be determined by the scope of the appended claims.

What is claimed is:

1. A device for manually detecting a malfunction or wrong operation of a solenoid operated valve operatively associated with a pilot operated directional control valve adapted to control the fluid pressure to be supplied into a piston-cylinder assembly for operating a clutch mounted in a multi-speed-stage automatic transmission for variable speed change of a vehicle, said pilot operated directional control valve including a valve body, said valve body including a drain chamber and being connected to a pilot fluid pressure supply source and a drain tank, said solenoid operated valve being mounted on said valve body and having an inlet port directly connected to said drain chamber and an outlet port connected through said valve body to said drain tank, said pilot operated directional control valve including a restrictor between said supply source and said drain chamber, said solenoid operated valve being adapted to be switched over to either a connecting position where said inlet port is connected to said drain port or a disconnecting position where said inlet port is disconnected from said drain port, said detecting device consisting essentially of a cylindrical chamber formed in an end of said valve body, said valve body having a communicating hole directly connecting said cylindrical chamber to said drain chamber adjacent said inlet port of said solenoid operated valve, a stopper plate covering said end of said valve body, and a plunger inserted into said cylindrical chamber so as to form a pressure chamber connected to said communicating hole, said plunger having seal means therearound and a reduced diameter portion projecting outwardly through a hole formed in said stopper plate wherein said plunger is able to be pushed manually into the pressure chamber only when pilot fluid is passing through said inlet port of said solenoid operated valve.

* * * * *